US006717654B1

(12) United States Patent
Rajchel et al.

(10) Patent No.: US 6,717,654 B1
(45) Date of Patent: Apr. 6, 2004

(54) COMBINED RANGE-FINDING, SIGHTING AND SCANNING SYSTEM AND METHOD

(75) Inventors: Suzanne K. Rajchel, Wheaton, IL (US); Michael G. Ressl, Western Springs, IL (US)

(73) Assignee: Vantageport, Inc., Western Springs, IL (US)

( * ) Notice: Subject to any disclaimer, the term of this patent is extended or adjusted under 35 U.S.C. 154(b) by 0 days.

(21) Appl. No.: 09/500,176

(22) Filed: Feb. 8, 2000

Related U.S. Application Data
(60) Provisional application No. 60/119,121, filed on Feb. 8, 1999.

(51) Int. Cl.$^7$ .............................. G01C 3/08; G01B 11/26
(52) U.S. Cl. .................................. 356/4.01; 356/141.1
(58) Field of Search .............................. 356/141.1, 4.01, 356/5.01, 5.1, 139.04

(56) References Cited

U.S. PATENT DOCUMENTS

| | | | | |
|---|---|---|---|---|
| 5,253,033 A | * | 10/1993 | Lipchak et al. | |
| 5,612,781 A | * | 3/1997 | Ohtomo et al. | ........... 356/152.2 |
| 5,838,239 A | * | 11/1998 | Stern et al. | |
| 5,877,856 A | * | 3/1999 | Fercher | |
| 6,134,010 A | * | 10/2000 | Zavislan | |

* cited by examiner

Primary Examiner—Stephen C. Buczinski
(74) Attorney, Agent, or Firm—Cardinal Law Group

(57) ABSTRACT

An optical system is provided which combines range-finding (distance measurement), sighting (target acquisition) and scanning capabilities. This single beam system uses a polarization selector and a retardation plate to take advantage of the polarization properties of light from a transmit source and of light reflected to a receiver. The system further includes scanning optics for moving the optical beam of light in relation to object in order gather information from the object. Methods for using the system are also provided.

22 Claims, 4 Drawing Sheets

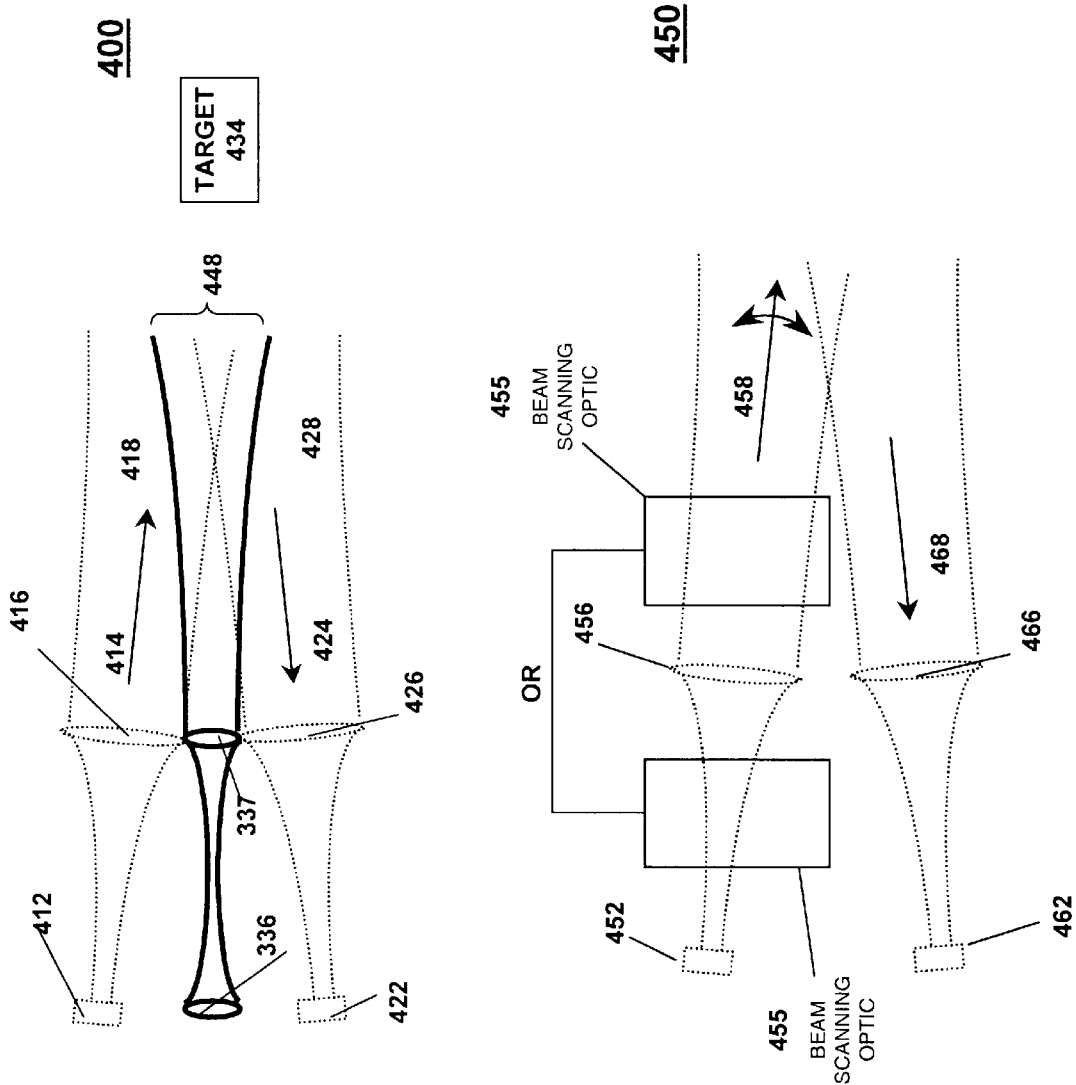

COMBINED RANGE-FINDING, SIGHTING AND SCANNING SYSTEM AND METHOD

CROSS-REFERENCE TO RELATED APPLICATION

This application claims the benefit of U.S. Provisional Patent Application Ser. No. 60/119,121, entitled "Combined Aiming, Range-Finding And Scanning System With Common Optics," and filed Feb. 8, 1999.

BACKGROUND OF THE INVENTION

Range-finding devices, are commonly used to determine distances in such industries as agriculture, aviation and nautical. Sighting devices or aiming/targeting devices, such as laser guns, speed guns, or RF guns, are commonly used to aim at a particular target and select it from a plurality of targets in military and surveying applications, for example. Meanwhile, scanning devices, are used to scan objects for information, particularly for reading bar codes, and to optically map surfaces for quality control purposes.

Currently, range-finding devices are not used for scanning; sighting devices are not used for distance measurement or scanning and scanning devices are not used for distance measurement or aiming. Typically a range-finding device might incorporate a visual sighting system but the range-finding system and the sighting system of the device are two separate systems; the visual sighting system is not easily integrated into automated range-finding devices. Furthermore, visual sighting systems suffer from a number of problems that limit their usefulness, such as: (a) daylight only operation if no external target illumination is used, (b) the need for the user to look through the device-which in certain circumstances is undesirable (e.g. while driving or participating in other activities requiring vision), (c) susceptibility to sighting errors induced by diminished visual acuity of the user, (d) the need to ergonomically design the system to allow for use with, or without, corrective or other glasses. Also, such visual aiming systems are not easily integrated for use in automated ranging systems. Finally, typical scanning sources are usually limited to visual light transmitters.

It would be desirable therefore to have an optical system capable of performing all three functions of distance measurement, target acquisition and scanning. It would further be desirable to have an optical system capable of automated aiming/target identification and data acquisition. It would also be desirable to have an optical system that is not limited to visual light sources for use in scanning.

As shown in FIG. 4, a typical dual beam range-finding/sighting system 400 includes one beam path 418 for a transmit system and another beam path 428 for a receiving system. If system 400 includes a visual sighting system (in bold), it is typically a telescopic lens system including at least one lens 336 (and, in the case of non-inverting image types, a second lens 337) and its own beam path 448.

In the dual beam system 400 of FIG. 4, the transmit source 412 of the transmit system emits light that travels through the lens 416. This light becomes the collimated outbound beam 414. The outbound beam 414 hits a target (an object in space such as, for example, a building, a bar code on the building or an identification unit mounted on the building). The outbound beam is reflected from the target and returns to the receiving system of the dual beam system via beam path 428. As this reflected beam 424 passes through lens 426, it is refracted so that it comes to a focus at receiver 422. Meanwhile, the lens(es) 336, 337 of the scanning system (in bold) of system 400 are mounted near the optics 416, 426 of the ranging system and oriented so as to capture the intended field of view of the target 434 as well as the ranging transmit (outbound) and ranging receive (inbound) overlap fields.

FIG. 4 also shows a typical scanning system 450 that includes a scanning transmit source 452 that emits light which travels through beam scanning optic 455 then through lens 456. This light becomes outbound beam 458. Alternatively, beam scanning optic 455 may be placed so that light travels through lens 456 first before going through optic 455. The outbound beam 458 hits a target which usually includes some feature or pattern that, when light is scanned across its surface, creates a modulation of the light reflected from the surface as a return beam 468. The outbound beam 458 is usually moved relative to the target to produce the desired data stream on the return beam 468 reflected from the target. This scanning movement may be accomplished manually by a user physically moving the device relative to the target, mechanically or electro-optically (the optical beam 458 is directed in a repetitive pattern to the target using beam steering technology). Once the return beam 468 is reflected from the target, it passes through lens 466 where it is refracted to come to a focus at receiver 462. Once at receiver 462, the return beam 468 is converted into an electrical signal that can be analyzed using appropriate electronics and software.

The techniques of optical beam combination have been used in other optical systems—such as microscopes that incorporate laser based micro-machining systems. However, the application of these techniques to distance measuring, range-finding, sighting and scanning systems for the purposes of reducing the overall system size, weight, complexity and cost would be desirable.

The integration of multiple range-finding, sighting and scanning technologies into one system will further make it desirable to render each component of the system, especially the optical system, as small as possible.

BRIEF DESCRIPTION OF THE DRAWINGS

FIG. 4 is a schematic view of two prior art systems that are collapsed into one system in the present embodiment—a prior art range-finding/sighting system and a prior art scanning system.

DETAILED DESCRIPTION OF THE PRESENTLY PREFERRED EMBODIMENTS

Figure 1:
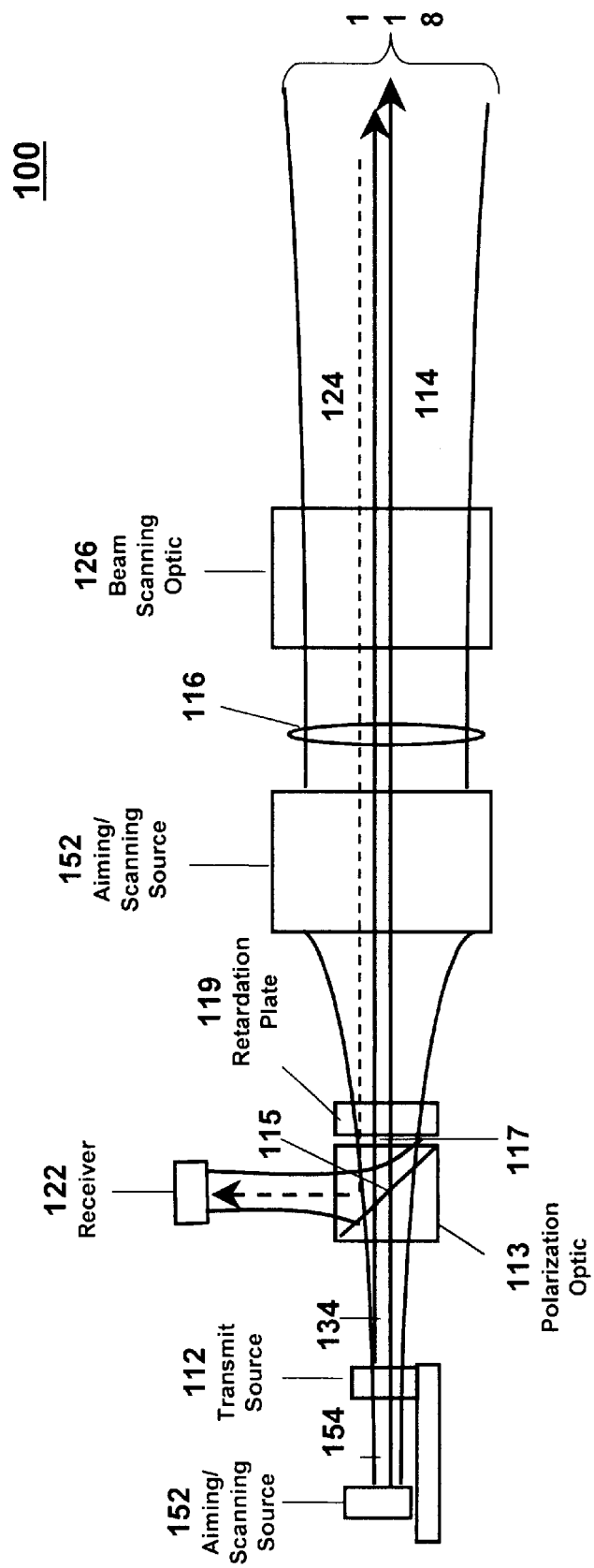
FIG. 1 is a schematic view of one embodiment of the combined range-finding/sighting/scanning system of the present invention.

Referring now to FIG. 1, one embodiment of an optical system 100 for a combined range-finding/sighting/scanning device is shown. Optical system 100 preferably relies on the polarization properties of the typical light sources used in conventional optics-based devices. Another optical system that similarly uses the polarization properties of light is described in U.S. patent application Ser. No. 09/447,786 (Attorney Docket No. 7230/6) filed on Nov. 23, 1999, entitled "Optical System And Method For Measuring Distance", herein incorporated by reference.

In system 100, transmit source 112 emits a linearly polarized outbound beam of light 134. System 100 also includes an aiming/scanning source 152 which is positioned behind the transmit source 112 in the embodiment of FIG. 1 and emits outbound signal 154. Signals 134 from transmit source 112 and signals 154 from aiming/scanning source 152 follow along the path which eventually comprises outbound beam 114. Outbound beam 114 may be a combined signal from transmit source 112 and aiming/scanning source 152 or beam 114 may be a path along which signals from sources 112 and 152 move concomitantly. Signals 154 from aiming/scanning source 152 may pass around the transmit source 112. In any case, outbound beam 114 is able to transmit light for range-finding purposes, target a given object for sighting purposes and be moved is relation to the object for scanning purposes. Transmit source 112 and aiming/scanning source 152 may be any source which emits light, such as, for example, a laser diode. It is also typical, though not required, that the emitted polarization type of the light 114 be fixed with respect to time. Alternatively, transmit source 112 and aiming/scanning source 152 may emit non-polarized or non-linearly polarized light 114, but this will increase loss of light from the system.

"Light" may include but is not limited to: non-polarized light; polarized light of elliptical, circular, linear or other orientation; radiation from sources emitting electromagnetic radiation in other than visible portions of the electromagnetic spectrum or any source of electromagnetic radiation that can emit polarized radiation. Polarized light may be defined as light in which the propagation of the E or B field perturbations of the wave of light is confined to one plane or one direction.

Outbound light 134 from transmit source 112 and outbound light 154 from aiming scanning source 152 then passes through polarization selector optic 113. This optic 113 is constructed and positioned so as to minimize loss and aberration of the transmitted beam 114. Polarization selector optic 113 may be any optic that is capable of differentiating between several polarizations of light. Polarization selector optic 113 may thus be an optic capable of selecting at least one particular polarization; it may further allow light of other polarizations to pass through it unaltered in polarization state.

Aiming/scanning beam sources 152 typically emit a linearly polarized outbound beam signal 154 (alternatively the aiming/scanning beam source may be a non-polarized or non-linearly polarized source but system losses are thereby increased). The beam 154 may pass through transmit source 112 and then through the appropriately oriented polarization selector 113 in the case of an aiming/scanning beam output wavelength that is poorly absorbed in the ranging transmit beam source. Alternatively, beam 154 may pass around transmit source 112 then through the appropriately oriented polarization selector optic 113. This optic 113 is typically constructed and positioned so as to minimize loss and aberration of the transmitted aiming/scanning beam. In the typical case, the polarized output 154 of source 152 passes unaltered through the polarization selector optic 113. It is preferred that the polarization of the aiming/scanning transmit source output 154 be aligned with optic 113 in such a way as to insure that the return aiming/scanning beam is of sufficient energy at the receiver 122 to achieve the required signal to noise ratio for analysis. With other aiming/scanning beam sources the polarization selector optic 113 can serve the purpose of creating a linearly polarized aiming/scanning beam at its output face 115. In these cases for example, aiming/scanning beam source 152 would emit non-polarized light 154 which, upon passing through selector 113, would become polarized.

In the embodiment of FIG. 1, light 134, 154 next encounters the retardation plate optic 119. This optic 119 is constructed and aligned to produce minimum reflections at its surface and to minimize transmission losses to the transmitted beam 134, 154. Retardation plate optic 119 could be any optic which is capable of rotating light (e.g. beam 134, 154), or more particularly, the polarization of light in a desired direction. In order to accomplish this, plate 119 is typically designed of crystalline material that has different indices of refraction along two separate crystal axes. Plate 119 is preferably constructed and positioned so as to produce wave front phase retardation on the either of transmitted beams 134,154. In the embodiment of FIG. 1, this wave front phase retardation is ¼ wave (45 degrees) from the original polarization state of beams 134, 154. Plate 119 may also be designed to minimize temperature effects.

In the case of a manual scanning system, the aiming/scanning beam 134, 154 next passes through lens 116 which collimates the beam to become the outbound aiming/scanning beam 114 emitted from the device. Alternatively, in the case of a mechanically, electro-optically or acousto-optically scanned system, the aiming/scanning beam 114 may also pass through a set of beam scanning optics 126 that serve to deflect the beam prior to its passage out of the device. Beam scanning optics 126 may be placed so that beam 114 passes through optics 126 before passing through lens 116. Or, beam scanning optics 126 may be placed so that beam 114 passes through lens 116 before passing through optics 126. Both positions are shown in FIG. 1.

The transmitted beam 114 now moves along beam path 118. The outbound beam 114 hits a target (an object in space such as, for example, a building, a bar code on the building or an identification unit mounted on the building). The outbound beam 114 is reflected from the target and returns to the system 100 via the same beam path 118. The transmitted light 114 is now return beam 124 which is heading for the receiver 122, but, as shown in FIG. 1, does not follow a different path back to a different lens as in systems 400, 450 of FIG. 4. Thus, incorporation of polarization selector optic 113 and retardation plate 119 allows the two beam paths 418, 428 of FIG. 4 to be reduced to one beam path 118 that is used for both transmit and receive. The paths 458, 468 of system 450 of FIG. 4 are also incorporated into beam path 118 that is additionally used for scanning transmit and receive. Finally, sighting path 448 of system 400 is also incorporated into beam path 118 to be used for target acquisition.

Once light 114 hits the target and is reflected, it becomes reflected light 124. This return beam 124 can be viewed, either aided or unaided, by the eye or by a suitably configured detection system. In the present invention, such a detection system is embodied by the combined aiming/scanning/ranging receiver 122 and by a device incorporating system 100. It is contemplated that system 100 includes signal detection electronics capable of processing the return signals incident on the receiver 122. These electronics may communicate with a computer and a software application(s) that polls the signal, determines the characteristics thereof and performs various analyses dependent upon the characteristics of the signal.

Return beam 124 now passes through lens 116 and through optic 126. Next return beam 124 passes through the retardation plate 119 which introduces another wave front phase retardation on the return beam 124. This second wave front phase retardation adds to that already present on the return beam 124 which occurred during outbound beam's 114 pass through the retardation plate 119. In the embodiment of FIG. 1, for example, the second wave front phase retardation on the return beam 124 is also ¼ wave (45 degrees).

Thus the polarization state of return beam 124 at point 117 is now x+45 degrees+180 degrees+45 degrees. Because the embodiment of FIG. 1, for example, discounts the 180 degrees for reasons described above, the return beam's 124 polarization state is effectively x+90 degrees at point 117 and is thus orthogonal to beam 114 originally transmitted from the transmit source 112 via the polarization selector 113.

The return beam 124 now encounters the polarization selector 113. Since the polarization state of the return beam 124 is now different to that originally transmitted by the polarization selector 113 in the form of the outbound beam 114, the return beam 124 is directed by polarization selector towards the receiver 122. Receiver 122 is any suitable substrate for receiving light, including for example, a silicon photo diode.

Receiver 122 converts the return optical beam 124 into an electrical signal that can be analyzed using the appropriate electronics and software to yield information pertinent to the target. Typically, such a receiver is either a photo-voltaic or photo-conductive device. Receiver 122 also performs the functions of a typical distance measuring (rangefinder) device. Receivers 122, 152 are generally capable of converting either a continuous or pulsed beam of light into an electrical signal.

Figure 2:
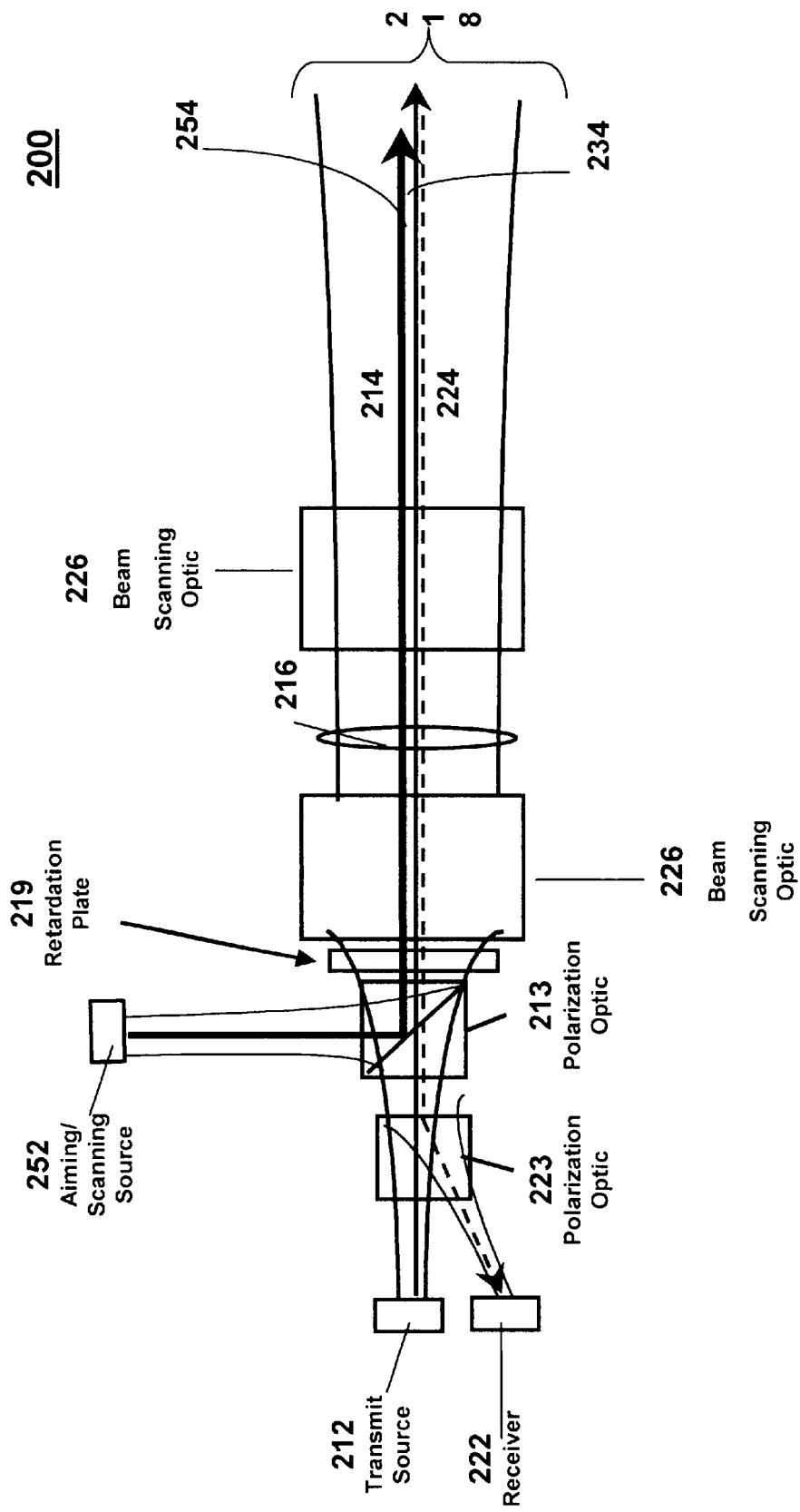
FIG. 2 is a schematic view of a second embodiment of the combined range-finding/sighting/scanning system of the present invention.

As shown in FIG. 2, addition of another polarization selector 223 can also determine the position of receiver 222 in relation to transmit source 212 and aiming/scanning source 252.

Outbound light 234 is transmitted from transmit source 212. Outbound light 254 is transmitted from aiming/scanning source 252 which is orthogonal to polarization selector optic 213 in FIG. 2. Both outbound light 234 and outbound light 254 then pass through polarization selector optic 213. This optic 213 is constructed and positioned so as to minimize loss and aberration of the transmitted beam 214. Polarization selector optic 213 may be any optic that is capable of differentiating between several polarizations of light. Polarization selector optic 213 may thus be an optic capable of selecting at least one particular polarization; it may further allow light of other polarizations to pass through it unaltered in polarization state. For example, in FIG. 2, beam 234 from transmit source 212 could pass through selector optic 213 unaltered.

Meanwhile, in the embodiment of FIG. 2, aiming/scanning beam source 252 could emit non-polarized light 254 which, upon passing through selector 213, would become polarized. The polarization of the aiming/scanning transmit source output 254 is aligned with optic 213 in such a way as to insure that the return aiming/scanning beam is of sufficient energy at the receiver 222 to achieve the required signal to noise ratio for analysis.

In the embodiment of FIG. 2, light 234, 254 next encounters the retardation plate optic 219. This optic 219 is constructed and aligned to produce minimum reflections at its surface and to minimize transmission losses to the transmitted beam 234, 254. Retardation plate optic 219 could be any optic which is capable of rotating light (e.g. beam 234, 254), or more particularly, the polarization of light in a desired direction. In the embodiment of FIG. 2, this wave front phase retardation is ¼ wave (45 degrees) from the original polarization state of beam 254.

In the case of a manual scanning system, the aiming/scanning beam 254 and the transmit beam 234 pass respectively through lens 216 which collimates the beams 234, 254 to become the outbound aiming/scanning beam 214 emitted from the device. Alternatively, in the case of a mechanically, electro-optically or acousto-optically scanned system, the beam 214 may also pass through a set of beam scanning optics 226 that serve to deflect the beam prior to passage out of the device. Beam scanning optics 226 may be placed so that beam 214 passes through optics 226 before passing through lens 216. Or, beam scanning optics 226 may be placed so that beam 214 passes through lens 216 before passing through optics 226. Both positions are shown in FIG. 2.

The transmitted beam 214 now moves along beam path 218. The outbound beam 214 hits a target (an object in space such as, for example, a building, a bar code on the building or an identification unit mounted on the building). This beam 214 can perform range-finding, target-acquisition and scanning operations while interacting with the target.

The outbound beam 214 is reflected from the target and returns to the system 200 via the same beam path 218. The transmitted light 214 is now return beam 224 which is heading for the receiver 222, but, as shown in FIG. 2, does not follow a different path back to a different lens as in systems 400, 450 of FIG. 4.

Once light 214 hits the target and is reflected, it becomes reflected light 224. This return beam 224 can be viewed, either aided or unaided, by the eye or by a suitably configured detection system. In the present invention, such a detection system is embodied by the combined aiming/scanning/ranging receiver 222 and by the system 200. It is contemplated that system 200 includes signal detection electronics capable of processing the return signals incident on the receiver 222. These electronics may communicate with a computer and a software application(s) that polls the signal, determines the characteristics thereof and performs various analyses dependent upon the characteristics of the signal.

Return beam 224 now passes through lens 216 and through optic 226. Next return beam 224 passes through the retardation plate 219 which introduces another wave front phase retardation on the return beam 224. This second wave front phase retardation adds to that already present on the return beam 224 which occurred during outbound beam's 214 pass through the retardation plate 219.

In the embodiment of FIG. 2, return beam 224 includes returning beam 234 and returning beam 254. Beam 234 originally passed through optic 213 unaltered but on its return pass is now altered in polarization, for example, by a wave front phase retardation of ¼ wave (45 degrees).

Beam 254 meanwhile was originally altered on its first pass through the selector optic 213 by a wave front retardation of ¼ wave (45 degrees). Now in its second pass through the optic 213, the second wave front phase retardation on the beam 254 is also ¼ wave (45 degrees).

Thus the polarization state of beam 254 (when it returns as return beam 224) is now effectively x+90 degrees at point 217 and is thus orthogonal to beam 214 originally transmitted from the transmit source 212 via the polarization selector 213.

In the embodiment of FIG. 2, the beam 224 is directed towards a second polarization selector optic 223. This optic 223 directs the beam towards receiver 222.

Once at receiver 222, the return beam 224 may be converted into an electrical signal that can be analyzed using appropriate electronics and software.

Receiver 222 converts the return optical beam 224 into an electrical signal that can be analyzed using the appropriate electronics and software to yield information pertinent to the target. Typically, such a receiver is either a photo-voltaic or photo-conductive device. Receiver 222 also performs the functions of a typical distance measuring receiver device. Receiver 222 is generally capable of converting either a continuous or pulsed beam of light into an electrical signal.

Figure 3:
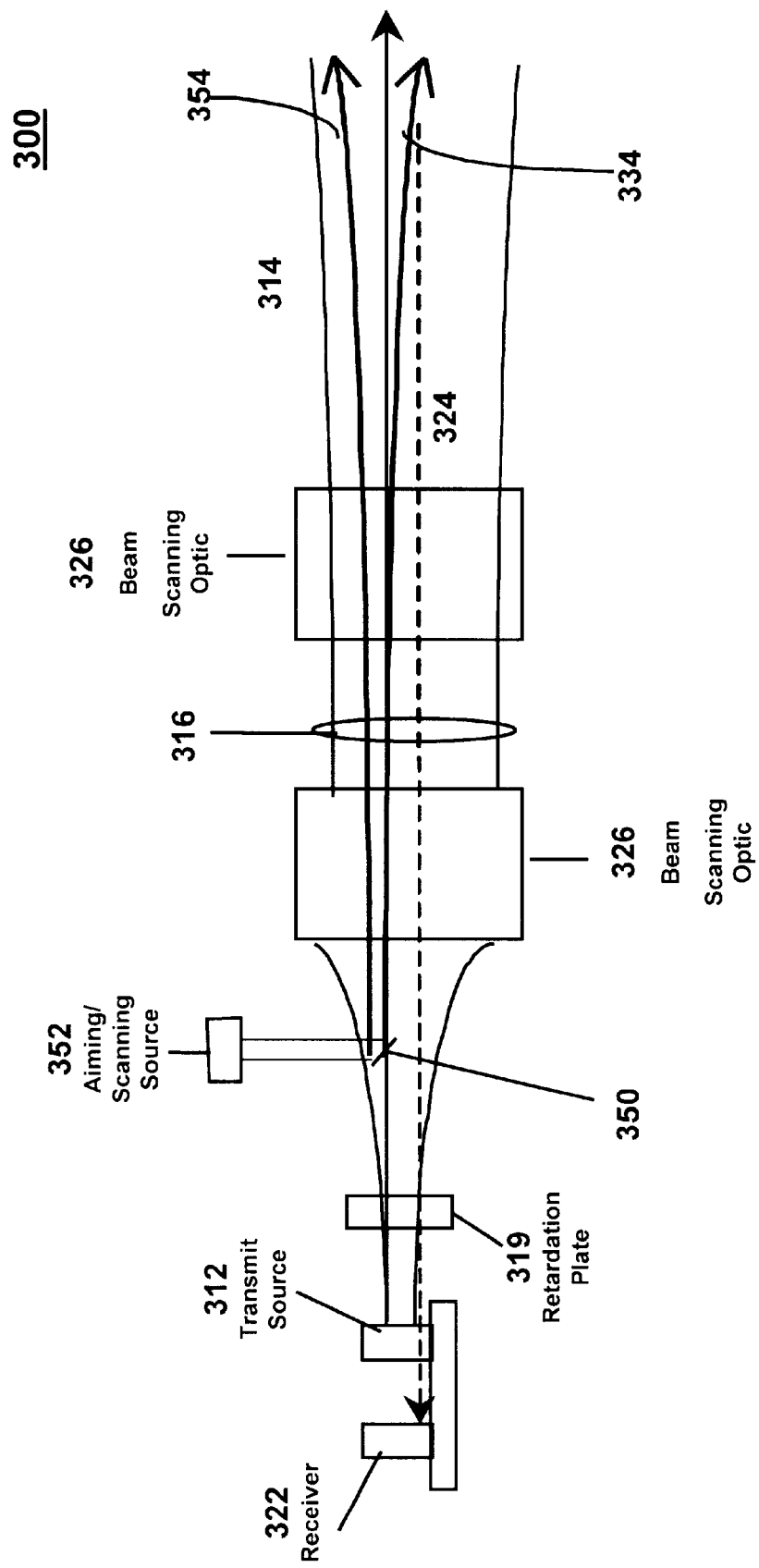
FIG. 3 is a schematic view of another embodiment of the combined range-finding/sighting/scanning system of the present invention.

In the configuration shown in FIG. 3, the aiming/scanning source 352 is coupled into the ranging transmit beam path 354 using a small reflective surface 350, such as a scraper mirror positioned between the retardation plate 319 and the lens 316. The scraper mirror 350 could be positioned so as to allow the full, or partial, aiming/scanning beam 354 to be reflected from its surface substantially collinearly with the ranging transmit beam 334. Such a scraper mirror 350 is typically placed in such a manner as to create minimum interference with the ranging transmit beam 334, either through attenuation or wavefront distortion. It may be desirable, but it is not necessary, to match the divergence, and spot size of the aiming/scanning source output beam 314 at lens 316 to that of the ranging transmit source.

As also shown in FIG. 3, in the case of a manual scanning system, the aiming/scanning beam 354 and the transmit beam 334 pass respectively through lens 316 which collimates the beams 334, 354 to become the outbound aiming/scanning beam 314 emitted from the device. Alternatively, in the case of a mechanically, electro-optically or acousto-optically scanned system, the beam 314 may also pass through a set of beam scanning optics 326 that serve to deflect the beam prior to passage out of the device. Beam scanning optics 326 may be placed so that beam 314 passes through optics 326 before passing through lens 316. Or, beam scanning optics 326 may be placed so that beam 314 passes through lens 316 before passing through optics 326. Both positions are shown in FIG. 3.

Beam 314 becomes return beam 324 after being reflected from a target in the manner previously described. Certain types of transmit sources 312 are substantially transparent to the return beam 324 wavelength. Thus it is possible to position receiver 322 behind transmit source 312. It may be desirable to mount both transmit source 312 and receiver 322 on the same substrate which is any suitable substrate for growing a transmit source 312. Mounting the transmitter and receiver on the same substrate may allow for simultaneous thermal control of both. However, receiver 322 is not required to be positioned in the orientation of FIG. 3.

As seen by comparing FIGS. 1–3 to FIG. 4, the designs of optical systems 100, 200 and 300 reduce the complexity and cost of presently available optics-based distance measuring systems. These configurations of the present invention simultaneously improve the function and manufacturability of such systems while decreasing the size and weight of sub-systems without sacrificing overall system performance. Systems 100, 200 utilize the polarization properties of the light 114, 124 to collapse what are typically five optical systems 418, 428, 448, 458 and 468 into one optical system 100 or 200. System 300 further uses the polarization properties of the light 214, 224 and the properties of certain types of reflective surfaces 323 to collapse optical systems 418, 428, 448, 458 and 468 into another streamlined optical system 300.

Optical systems 100, 200, 300 allow simultaneous reductions in all four dimensions of size, weight, complexity and cost while broadening the function of devices such as range-finders or scanners. Therefore devices incorporating systems 100, 200, 300 become more attractive for broader, or mass market uses. Optical systems 100, 200, 300 can also be used in conjunction with technologies of range-finding and compass readings for determining relative position and, with the absolute positioning of GPS, in order to determine the location of remote structures.

Furthermore, the systems of the present invention offer the possibility of significantly reducing range finding system manufacturing costs by lowering parts numbers and the requisite fixtures for those eliminated parts. Such low cost, reduced size, reduced complexity, minimum weight systems could conceivably be used by police, fire, ambulance, or any other type of emergency service, overnight delivery services, postal service, utility services, pizza delivery, meter-reading, golf courses, railroads, military vehicles, as well as private use.

Other potential applications include, but are not limited to: enhanced or mobile 911; enhanced directory services; air-traffic control; automobile and transportation; automated mass transit; public and private telecommunications systems; construction; geophysical and geologic industries; entertainment; medical; sports; manufacturing; mapping; meteorological applications; forestry management; agricultural industry; mining industry; aviation and nautical industries; HVAC systems; enhanced earth-moving systems; warehouse inventory management; ESDA haz-mat registry; tourism; mobile Internet access; and integration of this system with other systems.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. A combined ranging/scanning system, comprising:
   a ranging transmit source aligned with a retardation plate on a beam path to transmit an outbound ranging beam of light;
   a scanning transmit source aligned with the ranging transmit source to transmit an outbound scanning beam of light;
   a lens aligned on the beam path to allow the outbound beam to pass through the retardation plate and through the lens;
   a receiver aligned on the beam path to receive an inbound ranging beam and an inbound scanning beam, the inbound ranging beam and the inbound scanning beam being reflected from an object;
   at least one scanning optic aligned on the beam path with the lens, wherein the lens and the scanning optic simultaneously process the outbound ranging beam, the outbound scanning beam, the inbound ranging beam and the inbound scanning beam; and
   a first selector aligned with the receiver to differentiate beam, the outbound ranging beam, the outbound scanning beam, the inbound ranging beam and the inbound scanning beam.

2. The system of claim 1 wherein the ranging transmit source is substantially transparent to the outbound aiming beam and the outbound scanning beam.

3. The system of claim 1 wherein the scanning optic is positioned between the retardation plate and the lens in the beam path.

4. The system of claim 1 wherein the scanning optic is positioned after the lens in the beam path.

5. The system of claim 1 wherein the ranging transmit source is selected from the group consisting of:
   laser sources, incandescent sources, fluorescent sources, microwave sources, semiconductor sources, maser sources and plasma sources.

6. The system of claim 1 wherein the scanning transmit source is selected from the group consisting of:
   laser sources, incandescent sources, fluorescent sources, microwave sources, semiconductor sources, maser sources and plasma sources.

7. The system of claim 1 wherein the selector is a polarization selector that differentiates between at least two beams of light based on polarization of the light.

8. The system of claim 1 wherein the selector is substantially transparent to a ranging wavelength of the inbound ranging beam and to a ranging wavelength of the inbound scanning beam.

9. The system of claim 1 wherein the selector is positioned to allow the outbound ranging beam and the outbound scanning beam to pass through the selector before passing through the retardation plate.

10. The system of claim 1 further comprising:
    at least one additional selector aligned with the receiver on the beam path.

11. The system of claim 1 wherein the receiver is a substrate that receives light.

12. The system of claim 1 wherein the retardation plate is a device that rotates at least one polarization of light.

13. The system of claim 1, wherein the ranging transmit source, the scanning transmit source, the retardation plate, the scanning optic, the receiver and the selector are positioned within a housing.

14. The system of claim 1 wherein the ranging inbound beam and the scanning inbound beam are coincident on the receiver.

15. A method of transmitting light in a combination ranging/scanning system comprising the steps of:
    transmitting an outbound scanning beam of light from a scanning transmit source;
    transmitting an outbound ranging beam of light from a ranging transmit source to a retardation plate, the ranging transmit source being aligned in a beam path with the scanning transmit source;
    rotating polarization of the outbound ranging beam with the retardation plate so that the outbound ranging beam has an outbound ranging polarization;
    further transmitting the outbound ranging beam through a scanning optic, the scanning optic bag aligned in the beam path;
    further transmitting the outbound ranging beam through a lens to an object;
    reflecting the outbound ranging beam from the object, creating an inbound ranging beam directed to the lens, wherein the inbound ranging e caries ranging information about the object;
    reflecting the outbound scanning beam from the object, creating an inbound scanning beam;
    rotating polarization of the inbound ranging beam so that the inbound ranging beam has an inbound ranging polarization different from the outbound ranging polarization; and
    receiving the inbound ranging beam and the inbound scanning beam at a single receiver aligned in the beam path.

16. The method of claim 15 further comprising:
    transmitting the outbound ranging beam through the selector before transmitting the outbound ranging beam through the retardation plate.

17. The method of claim 15 wherein the outbound ranging beam, the outbound scanning beam, the inbound ranging beam and the inbound scanning beam are processed simultaneously.

18. The method of claim 15 wherein the ranging transmit source, the retardation plate, the lens, the scanning optic, the receiver and the first selector are aligned on a single beam path.

19. The method of claim 15 wherein the ranging transmit source is substantially transparent to the inbound ranging beam, further comprising:
    sending the inbound ranging beam to the receiver through the ranging transmit source.

20. An apparatus for gathering information about an object comprising:
    a housing;
    a ranging transmit source for transmitting an outbound ranging beam, the ranging transmit source being attached to the housing;
    a retardation plate for rotating polarization of light the retardation plate being aligned in a beam path with the ranging transmit source in the housing;
    a scanning source for transmitting an outbound scanning beam, the scanning source being aligned in the beam path;
    at least one scanning optic for moving the outbound scanning beam relative to the object, the scanning optic being aligned in the beam path;
    a receiver for receiving an inbound ranging beam and an inbound scanning beam, wherein the inbound ranging beam comprises the outbound ranging beam reflected from an object and the inbound scanning beam comprises the outbound scanning beam reflected from the object, the receiver being aligned in the beam path;
    a lens aligned on the beam path so that the outbound ranging beam passes through the retardation plate and the lens, wherein the lens and the scanning optic simultaneously process the outbound ranging beam, the outbound scanning beam, the inbound ranging beam and the inbound scanning beam; and
    a selector aligned on the beam path to differentiate between the outbound ranging beam, the outbound scanning beam, the inbound ranging beam and the inbound scanning beam.

21. The apparatus of claim 20 wherein the scanning optic is positioned between the retardation plate and the lens.

22. The apparatus of claim 20, further comprising:
    an additional selector aligned with the receiver in the beam path.

* * * * *